United States Patent
Melchior et al.

(10) Patent No.: US 6,637,947 B2
(45) Date of Patent: Oct. 28, 2003

(54) OPTICAL COUPLING CONFIGURATION

(75) Inventors: Lutz Melchior, Berlin (DE); Volker Plickert, Brieselang (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 10/194,900

(22) Filed: Jul. 12, 2002

(65) Prior Publication Data
US 2003/0002799 A1 Jan. 2, 2003

Related U.S. Application Data

(63) Continuation of application No. PCT/DE01/00087, filed on Jan. 5, 2001.

(30) Foreign Application Priority Data

Jan. 12, 2000 (DE) .......................... 100 01 679

(51) Int. Cl.⁷ ................................ G02B 6/36
(52) U.S. Cl. .................. 385/88; 385/49; 385/31; 385/92
(58) Field of Search .................. 385/31, 39, 49, 385/88, 89, 92, 93, 94, 14

(56) References Cited

U.S. PATENT DOCUMENTS

| | | | |
|---|---|---|---|
| 4,297,653 A | 10/1981 | Scifres et al. | |
| 5,163,113 A | * 11/1992 | Melman | 385/31 |
| 5,400,419 A | 3/1995 | Heinen | |
| 5,987,202 A | * 11/1999 | Gruenwald et al. | 385/49 |
| 2002/0041731 A1 | * 4/2002 | Fujita et al. | 385/31 |

FOREIGN PATENT DOCUMENTS

EP 0 600 267 A1 6/1994

* cited by examiner

*Primary Examiner*—Hemang Sanghavi
(74) *Attorney, Agent, or Firm*—Laurence A. Greenberg; Werner H. Stemer; Gregory L. Mayback

(57) ABSTRACT

The optic coupling system links a fiber-optics waveguide with two optoelectronic components. The components are disposed on a substrate with an interposed beam-splitting layer. The light incidence or light emission surface of the first optoelectronic element is disposed perpendicular to the substrate. The coupling system is either a bi-directional transmitter and receiver module or a mono-directional transmitter or receiver module. To this end, the light incidence or light emersion surface of the second optoelectronic element is disposed in parallel to the substrate and the beam-splitting layer is disposed on a surface that is arranged above the second optoelectronic element at an angle of approximately 45° with respect to the substrate.

6 Claims, 3 Drawing Sheets

OPTICAL COUPLING CONFIGURATION

CROSS-REFERENCE TO RELATED APPLICATION

This application is a continuation of copending International Application No. PCT/DE01/00087, filed Jan. 5, 2001, which designated the United States and which was not published in English.

BACKGROUND OF THE INVENTION

Field of the Invention

The invention lies in the field of connecting optical conductors to optoelectronic components and is to be applied in configuring the design of a configuration wherein an optical conductor is optically coupled to two optoelectronic components, arranged on parallel surface regions of a common substrate, by interposition of a layer acting in a beam splitting fashion. Such coupling configurations are required in order to be able, via a single optical conductor, to transmit either two transmission or reception signals of different wavelengths in a unidirectional fashion, or one transmission and one reception signal in a bidirectional fashion.

The term optoelectronic component as used in the context of this description and the claims is to be understood as a transmitter or a receiver. Under electric control, an optoelectronic component constructed as a transmitter converts electrical signals into optical signals that are emitted in the form of light signals. An optoelectronic component constructed as a receiver converts optical signals that have been applied to it into corresponding electrical signals that can be tapped at the output side. Furthermore, an optical conductor is understood as any device for relaying optical signals guided in a spatially bounded fashion, in particular assembled optical waveguides. A layer acting in a beam splitting fashion is to be understood as all layer structures that serve the geometrical or physical splitting of beams, in particular metal or dielectric reflecting surfaces.

In a prior art optical coupling configuration that is constructed as a bidirectional transceiver module, the light exit surface of one optoelectronic component, constructed as transmitter (laser diode) runs perpendicular to the substrate, while the light entry surface of the other optoelectronic component, constructed as receiver (photodiode) is aligned at an angle of approximately 55° to the substrate. That angle results from the fact that the photodiode is constructed in a surface region of a crystal member wherein two crystal planes enclose an angle of approximately 55°. A layer acting in a beam splitting fashion is constructed on the photodiode. A light bundle emitted by the laser diode is partially reflected at the layer acting in a beam splitting fashion. After deflection by a lens, the reflected light bundle runs perpendicular to the substrate and is launched into an optical conductor. Another light bundle, which runs in a fashion emanating from the optical conductor and perpendicular to the substrate, is reflected by the lens such that, after partial transmission through the layer acting in a beam splitting fashion, it strikes the light entry surface of the photodiode at an angle of incidence of approximately 35°. It is thereby impossible to use this optical coupling configuration as a unidirectional transmission module by exchanging the receiver (photodiode) for a transmitter. See German published patent application DE 44 11 380 A1.

International PCT publication WO 00 00861 A discloses a generic optical coupling configuration with two optoelectronic components that are arranged next to one another on a common substrate. In this case, the light entry or light exit surface of the first optoelectronic component runs perpendicular to the substrate, and the light entry or exit surface of the second optoelectronic component runs parallel to the substrate. An optical element has a layer acting in a beam splitting fashion that is aligned above the second optoelectronic component at an angle of approximately 45° to the substrate.

U.S. Pat. No. 5,479,540 describes a bidirectional optoelectronic transceiver module in the case of which two optoelectronic components are likewise arranged next to one another on a common substrate. A diffractive disk that is aligned parallel to the substrate serves as a beam splitting layer.

SUMMARY OF THE INVENTION

It is accordingly an object of the invention to provide an optical coupling configuration wherein the two optoelectronic components can be constructed both as receivers and as transmitters and which overcomes the above-mentioned disadvantages of the heretofore-known devices and methods of this general type and which is distinguished by a compact design and is easy to adjust.

With the foregoing and other objects in view there is provided, in accordance with the invention, an optical coupling configuration for connecting an optical conductor to first and second optoelectronic components each having a light entry or light exit surface, comprising:

- a common substrate having parallel surface regions respectively carrying the optoelectronic components adjacent one another;
- wherein the optoelectronic components are arranged such that the light entry or light exit surface of the first optoelectronic component extends substantially perpendicular to the substrate and the light entry or light exit surface of the second optoelectronic component extends substantially parallel to the substrate;
- a molded part formed of an optically transparent material and having a first surface fastened on one of the light entry or light exit surfaces and a second surface; and
- a beam-splitting layer formed on the second surface above the second optoelectronic component and enclosing an angle of substantially 45° with the substrate.

Instead of the molded part, it is also possible, in accordance with a second embodiment of the invention, for the beam-splitting layer to be formed on the coupling end face of the optical conductor.

In other words, in a first variant of the invention it is provided that the layer acting in a beam splitting fashion is constructed on a surface of a molded part that consists of an optically transparent material and which has at least one further surface with the aid of which it is fastened on one of the light entry or light exit surfaces. This permits the optical coupling configuration to be adjusted easily. The molded part can be a prism or a beam splitting cube, for example.

In the second variant of the invention, the layer acting in a beam splitting fashion is constructed on the coupling end face of an optical conductor running parallel to the substrate.

In both cases, the light entry or light exit surface of the second optoelectronic component runs parallel to the substrate, and the beam-splitting layer is constructed on a surface that is aligned above this second optoelectronic component at an angle of approximately 45° to the substrate.

Since the light entry or light exit surfaces of the optoelectronic components run perpendicular or parallel to the substrate, it is possible to arrange conventional transmitters and/or receivers directly on the substrate without additional special support elements. As a result, the planar design is simplified and the optoelectronic components can be bonded via very short wires to electric terminals arranged on the substrate. It is possible to achieve high transmission rates because of these short connections.—The optoelectronic components can also be integrated in layer sequences grown on a substrate.

The beam-splitting layer, i.e., the layer acting in a beam splitting fashion that is aligned at an angle of 45° to the substrate, splits the light bundle impinging perpendicularly in the direction of the substrate into a first light bundle, running parallel to the substrate, and a second light bundle, running perpendicular to the substrate.

In the reverse direction, the first and the second light bundles are united to form a light bundle running perpendicularly away from the substrate. It is thereby possible to construct the optical coupling device either as a bidirectional transceiving module or as a unidirectional transceiving module. In this way, the optoelectronic components used as receivers can have a small light entry surface because of the perpendicular incidence of light.

With regard to the use of optoelectronic components that transmit or receive beams of different wavelengths, it is advantageous when the layer acting in a beam splitting fashion is constructed as a wavelength-selective reflecting layer.

Other features which are considered as characteristic for the invention are set forth in the appended claims.

Although the invention is illustrated and described herein as embodied in an optical coupling configuration, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
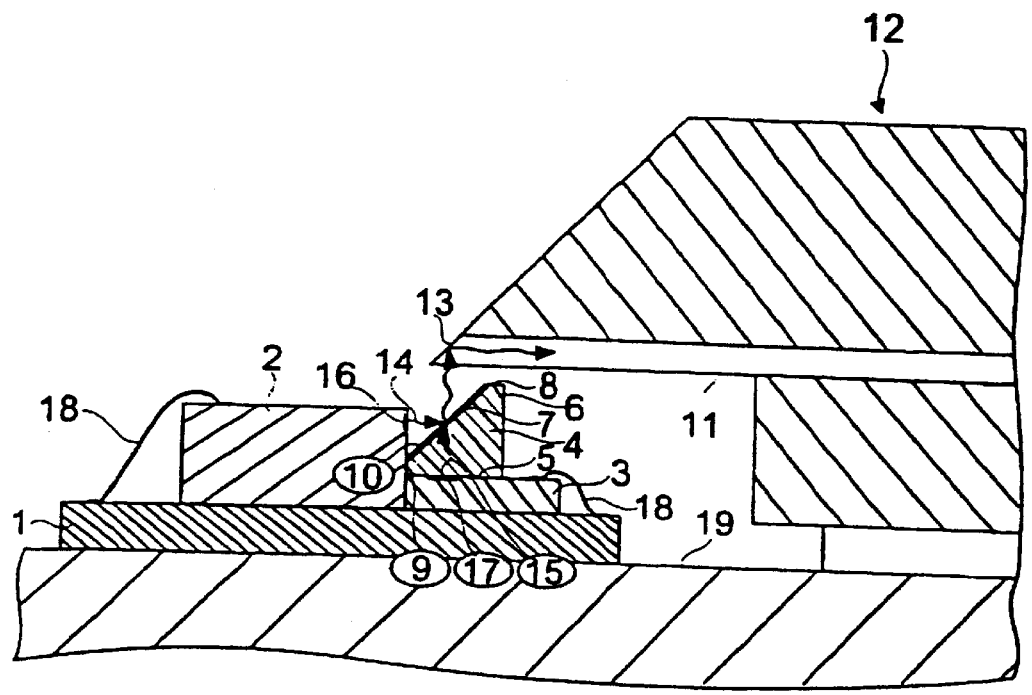
FIGS. 1 and 2 are sectional illustrations of optical coupling configurations wherein the layer acting as a beam splitter is constructed on a surface of a prism.
Figure 2:
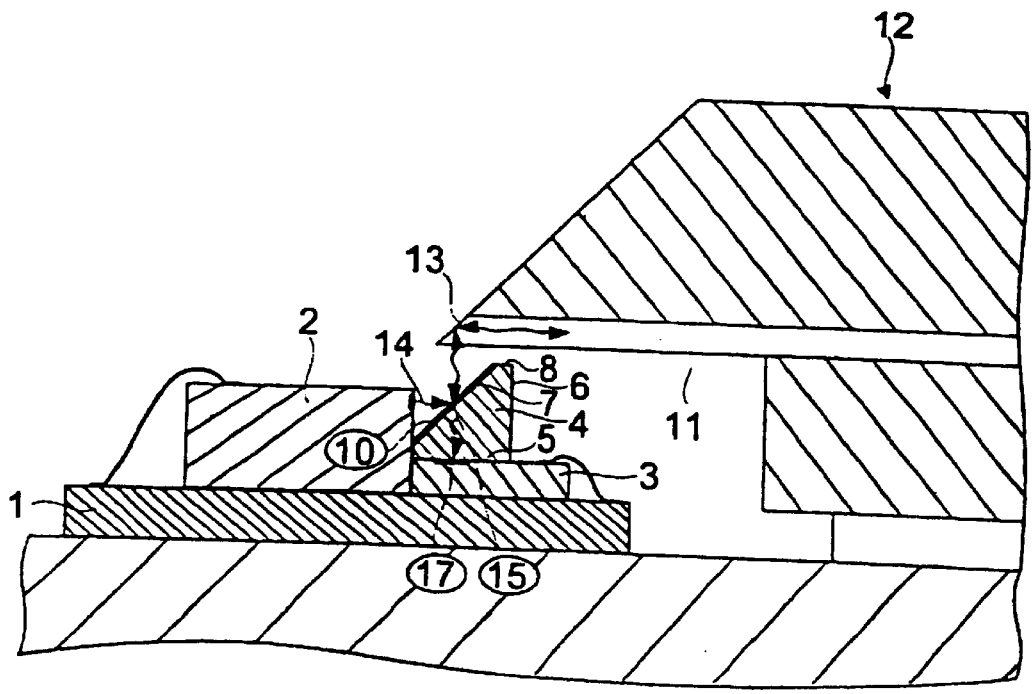

Referring now to the figures of the drawing in detail and first, particularly, to FIGS. 1 and 2 thereof, there is shown a respective optical coupling configuration having a substrate 1 on which there are disposed next to one another a first optoelectronic component 2 and a second optoelectronic component 3. The first optoelectronic component 2 is constructed in this case to be higher than the second optoelectronic component 3. Above the second optoelectronic component 3 there is arranged a molded part that is constructed as a prism 4 and consists of an optically transparent material and whose cross section is in the shape of a right-angled isosceles triangle. The prism 4 lies with a perpendicular face 5 on the second optoelectronic component 3, the hypotenuse section 7 facing the first optoelectronic component 2. The edges of the prism that are opposite the perpendicular faces 5, 6 are cut in such a way that a first and a second face of intersection 8, 9 run respectively parallel to one of the perpendicular faces 5, 6. The hypotenuse face 7 has a layer 10 acting in a beam splitting fashion. The layer 10 is preferably vapor deposited and acts to reflect in a wavelength-selective fashion. An optical conductor 11 that is fixed in a coupling element 12 and runs parallel to the substrate 1 has at its end a coupling end face 13 that is constructed as a ground bevel of approximately 45° with which it projects over the beam-splitting layer 10 in the manner of a cantilever. The cladding of the optical conductor 11 is exposed at the end of the optical conductor in the direction of the substrate 1.

The optical coupling configuration in accordance with FIG. 1 is constructed as a unidirectional transmitting module with wavelength division multiplex. In this case, the first optoelectronic component 2 is constructed as an edge-emitting transmitter that emits a first light bundle 14 with a wavelength $\lambda 1$ of, for example, 1300 nm. The second optoelectronic component 3 is constructed as a vertically emitting transmitter that emits a second light bundle 15 with a wavelength $\lambda 2$ of, for example, 850 nm. The prism 4 with bears with the second surface of intersection 9 against the first optoelectronic component 2, and with the perpendicular face 5 against the second optoelectronic component 3, and is fastened by bonding, for example. The light exit surface 16 of the edge-emitting transmitter 2 runs perpendicular to the substrate 1 and is situated opposite the hypotenuse face 7 of the prism 4. Consequently, the optical axis of the first light bundle 14 runs parallel to the substrate 1, impinges at an angle of incidence of approximately 45° on the layer 10 acting to reflect in a wavelength-selective fashion, and is reflected at said layer in the direction of the coupling end face 13 of the optical conductor 11. The light exit surface 17 of the vertically emitting transmitter 3 runs parallel to the substrate 1, such that the second light bundle 15 runs through the prism 4 perpendicular to the substrate 1, crosses the optical axis of the first light bundle 14 on the layer 10 acting to reflect in a wavelength-selective fashion, and passes through this layer, which is transparent to the wavelength $\lambda 2$. Since the optical axes of the two light bundles 14, 15 cross on the layer 10 acting to reflect in a wavelength-selective fashion, the two of these impinge on the coupling end face 13 of the optical conductor 11.

The reflectivity of the layer 10 acting to reflect in a wavelength-selective fashion for the first light bundle 14 of wavelength $\lambda 1$ or the transmissivity of this layer for the second light bundle 15 of wavelength $\lambda 2$ can be adjusted, for example, by dielectric layer sequences. Owing to the simple planar design, the optoelectronic elements 2, 3 are bonded via very short wires 18 to electric conductor tracks arranged on the substrate 1. High transmission rates can be achieved thereby. The substrate 1 and the coupling element 12 can subsequently be adjusted and fixed relative to one another on a common mounting plane 19.

The optical coupling configuration in accordance with FIG. 2 is constructed as a bidirectional transceiving module (transmitter/receiver). Similarly to the configuration in accordance with FIG. 1, the first optoelectronic component 2 is thereby constructed as an edge-emitting transmitter that emits the first light bundle 14 of wavelength λ1. The second optoelectronic component 3 is constructed as receiver for a second light bundle 15 of wavelength λ2, whose light entry surface 17 runs parallel to the substrate 1. The second light bundle 15 is coupled out of the optical conductor 11 perpendicular to the substrate 1 via the coupling end face 13, constructed as a ground bevel of approximately 45°, of the optical conductor 11. It penetrates the layer 10 acting to reflect in a wavelength-selective fashion, traverses the prism 4 and impinges in a perpendicular fashion on the light entry surface 17 of the receiver.

Figure 3:
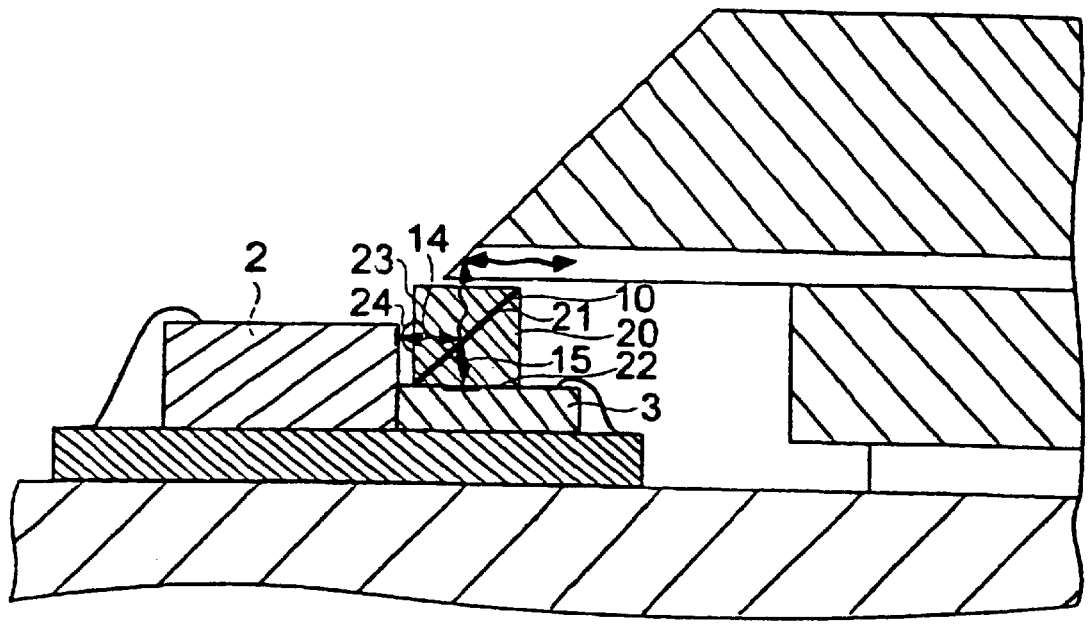
FIG. 3 is a sectional illustration of a coupling configuration wherein the layer acting as a beam splitter is constructed in a beam splitting cube.

In accordance with FIG. 3, the layer 10 acting to reflect in a wavelength-selective fashion is arranged in a molded part, constructed as a beam splitting cube 20, on a surface 21 inclined at 45° to the substrate. The beam splitting cube 20 consists of an optically transparent material and is arranged with one side 22 on the second optoelectronic component 3. In order to focus the first light bundle 14, the beam splitting cube 20 has a positive lens 24 at another side 23, facing the first optoelectronic component 2. The beam splitting cube 20 can also be fastened by bonding, for example, on both optoelectronic components 2, 3.

Figure 4:
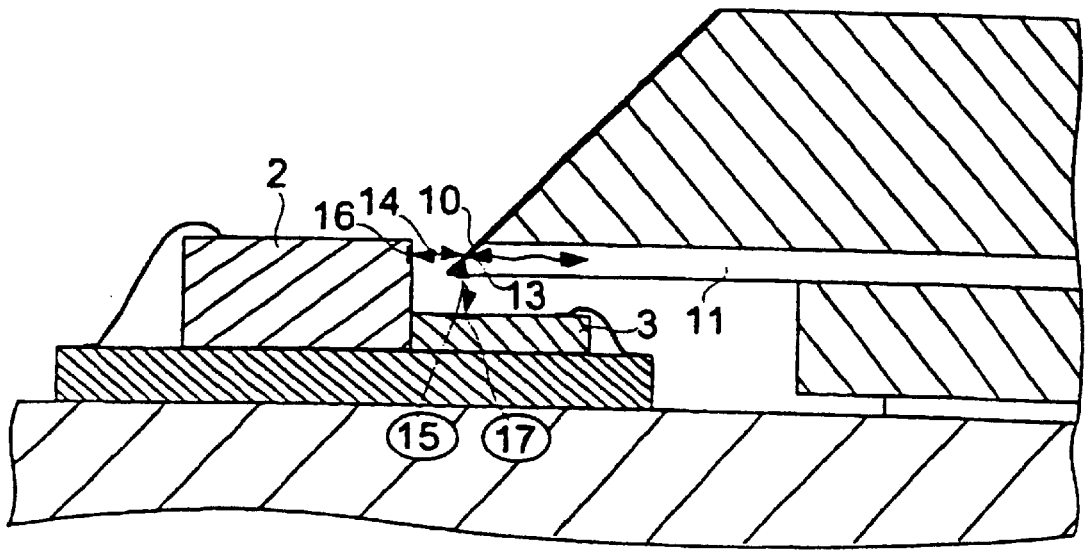
FIG. 4 is a sectional illustration of a coupling configuration wherein the layer acting as a beam splitter is constructed on the coupling end face of an optical conductor.

In accordance with FIG. 4, the beam-splitting layer 10 is formed directly on the coupling end face 13 of an optical conductor 11 whose longitudinal axis runs approximately at the level of the light exit surface of the first optoelectronic component 2, which is of higher construction. The coupling end face 13 of the optical conductor 11 thereby on the one hand is opposite the light entry or light exit surface 16 of the first optoelectronic component 2, while on the other hand it projects in the manner of a cantilever over the light entry or light exit surface 17 of the second optoelectronic component 3, which is of lower construction. At the coupling end face 13, provided with a layer 10 acting to reflect in a wavelength-selective fashion, the first light bundle 14 of wavelength λ1 is merely slightly deflected by refraction in its direction of propagation, such that it runs between the coupling end face 13 and the light entry or light exit face 16 of the first optoelectronic component 2 in a fashion substantially parallel to the substrate 1. The second light bundle 15 of wavelength λ2 is reflected at the coupling end face 13 in such a way that it runs between the coupling end face 13 and the light entry or light exit surface 17 of the second optoelectronic component 3 in a fashion perpendicular to the substrate 1. The transmissivity of the layer 10 acting to reflect in a wavelength-selective fashion for the first light bundle 14 of wavelength λ1 or the reflectivity of this layer for the second light bundle 15 of wavelength λ2 can be adjusted here, as well, by dielectric layer sequences, for example.

Figure 5:
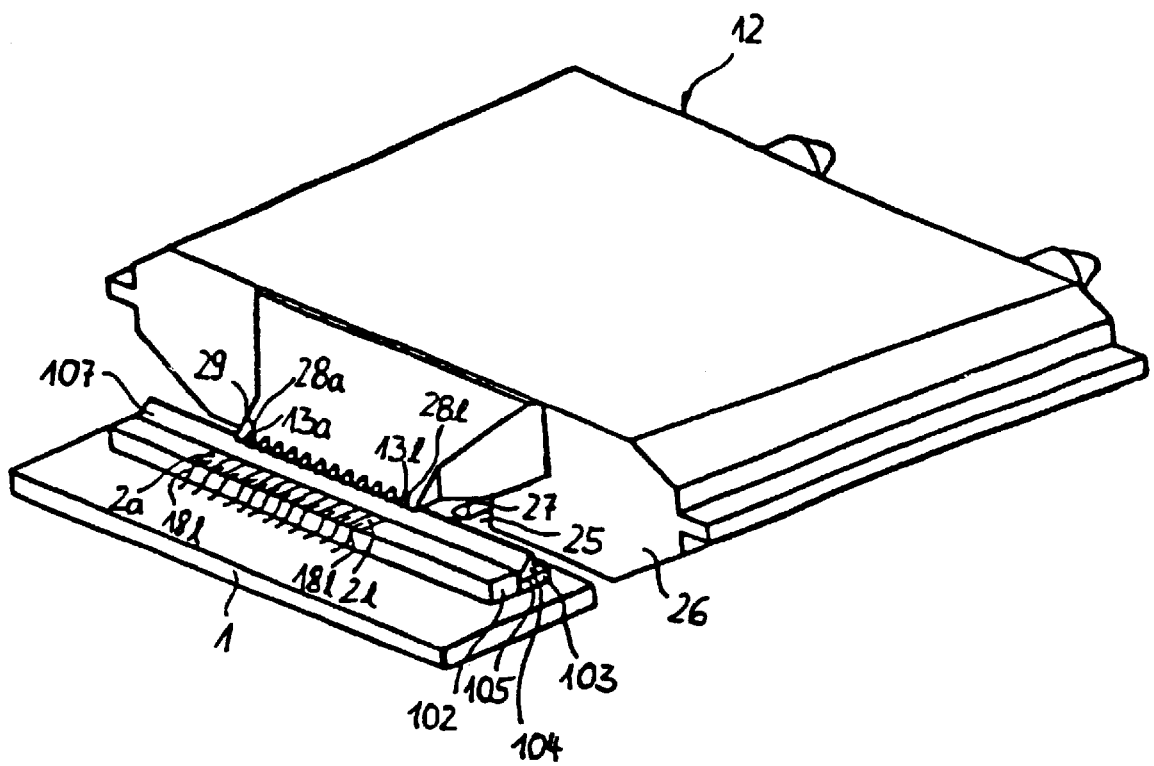
FIG. 5 is a perspective illustration of a coupling configuration with optoelectronic components arranged in the form of arrays with a prism array and with a plurality of optical conductor sections fixed in a coupling element.

A plurality of optical conductors that are contained in a coupling element in the form of optical conductor sections, for example, can be coupled to optoelectronic components is assigned to them by the juxtaposition of a plurality of coupling configurations in accordance with FIGS. 1 to 4. In accordance with FIG. 5, a plurality of coupling configurations in accordance with FIG. 1 or 2 can be juxtaposed. For this purpose, the optoelectronic components 2a . . . 2l, 3a . . . 3l in the form of a first and a second transmitting and/or receiving array 102, 103 can be applied to the substrate 1. A prismatic array 104 has a layer acting in a beam splitting fashion on its hypotenuse face 107 facing the first array 102, and rests with a perpendicular face 105 on the second array 103. The coupling element 12, which comprises a precision part 26, having a cutout 25, and a slide 27, projects over the prismatic array 104 in the manner of a cantilever. Constructed at the base of the cutout 25 are V-grooves 28a . . . 28l, wherein optical conductor sections 11a . . . 11l (only their coupling end faces 13a . . . 13l are visible in the illustration) are arranged. These optical conductor sections 11a . . . 11l are fixed by the slide 27. The precision part 26 has an end face 29 inclined by 45° on the side facing the arrays 102, 103. This end face 29 is ground and polished together with the coupling end faces 13a . . . 13l. This end face 29 can be metallized subsequently.—In the case of a juxtaposition of coupling configurations in accordance with FIG. 4, this end face 29 of the precision part 26 is provided with a layer acting in a beam splitting fashion.

The slide 27 does not reach up to the end face 29 of the precision part 26, and so the outer sheaths of the optical conductor sections 11a . . . 11l are exposed on the side facing the prismatic array 104. The two arrays 102, 103 of the optoelectronic components 2a . . . . 2l, 3a . . . 3l can easily be adjusted to one another on the substrate 1 via the prismatic array 104, and be bonded via short wires 18a . . . 18l to electric conductor tracks arranged on the substrate 1.

We claim:

1. An optical coupling configuration for connecting an optical conductor to first and second optoelectronic components each having a light entry or light exit surface, comprising:

a common substrate having parallel surface regions respectively carrying the optoelectronic components adjacent one another;

wherein the optoelectronic components are arranged such that the light entry or light exit surface of the first optoelectronic component extends substantially perpendicular to said substrate and the light entry or light exit surface of the second optoelectronic component extends substantially parallel to said substrate;

a molded part formed of an optically transparent material and having a first surface fastened on one of the light entry or light exit surfaces and a second surface; and a beam-splitting layer formed on said second surface above the second optoelectronic component and enclosing an angle of substantially 45° with said substrate.

2. The configuration according to claim 1, wherein said molded part is a prism formed with said second surface on which said beam-splitting layer constructed.

3. The configuration according to claim 1, wherein said molded part is a beam-splitting cube, and said second surface with said beam-splitting layer extends in said beam-splitting cube.

4. The configuration according to claim 1, wherein said beam-splitting layer is a wavelength-selective reflecting layer.

5. An optical coupling configuration for connecting an optical conductor having a coupling end face to first and second optoelectronic components each having a light entry or light exit surface, comprising:

a common substrate extending substantially parallel to the optical conductor and carrying the optoelectronic components adjacent one another;

wherein the optoelectronic components are arranged such that the light entry or light exit surface of the first optoelectronic component extends substantially perpendicular to said substrate and the light entry or light exit surface of the second optoelectronic component extends substantially parallel to said substrate; and a beam-splitting layer formed on the coupling end face of the optical conductor and aligned above the second optoelectronic component to enclose an angle of substantially 45° with said substrate.

6. The configuration according to claim 5, wherein said beam-splitting layer is a wavelength-selective reflecting layer.

* * * * *